United States Patent [19]

Potocnjak

[11] Patent Number: 4,993,905
[45] Date of Patent: Feb. 19, 1991

[54] APPARATUS FOR DEPOSITING LONG PIECES OF MATERIAL

[75] Inventor: Tomislav Potocnjak, Lauffen, Fed. Rep. of Germany

[73] Assignee: Tepora Transportsysteme Entwicklungs GmbH, Lauffen, Fed. Rep. of Germany

[21] Appl. No.: 387,219

[22] Filed: Jul. 28, 1989

[30] Foreign Application Priority Data

Jul. 28, 1988 [DE] Fed. Rep. of Germany ....... 3825570

[51] Int. Cl.⁵ .............................................. B65G 1/06
[52] U.S. Cl. .................................... 414/277; 414/284; 414/373; 414/585
[58] Field of Search .............. 414/266, 267, 268, 269, 414/277, 280, 281, 284, 286, 373, 585, 793.5, 793.6, 793.7

[56] References Cited

U.S. PATENT DOCUMENTS

| | | | |
|---|---|---|---|
| 2,406,992 | 9/1946 | Butler | 414/373 X |
| 3,214,934 | 11/1965 | Taylor et al. | 414/277 X |
| 3,474,916 | 10/1969 | Williams | 414/793.5 X |
| 4,063,653 | 12/1977 | Halada | 414/284 X |
| 4,205,934 | 6/1980 | Pantin et al. | 414/793.5 |
| 4,439,091 | 3/1984 | Frias | 414/277 X |
| 4,459,078 | 7/1984 | Chiantella et al. | 414/284 X |
| 4,470,741 | 9/1984 | Bossler et al. | 414/280 |
| 4,541,766 | 9/1985 | Dahl | 414/281 X |
| 4,756,657 | 7/1988 | Kinney | 414/281 |
| 4,856,956 | 8/1989 | Zur | 414/281 X |

FOREIGN PATENT DOCUMENTS

| | | | |
|---|---|---|---|
| 1224425 | 7/1987 | Canada | 414/280 |
| 2831084 | 2/1979 | Fed. Rep. of Germany | 414/793.5 |
| 53-91276 | 8/1978 | Japan | 414/572 |
| 58-155606 | 3/1985 | Japan | 414/280 |
| 62-88630 | 4/1987 | Japan | 414/284 |

Primary Examiner—Robert J. Spar
Assistant Examiner—Robert S. Katz
Attorney, Agent, or Firm—Robert W. Becker & Associates

[57] ABSTRACT

An apparatus for depositing long pieces of material, such as pipes, rods, etc., in a shelf unit that has a number of receiving spaces for the long pieces of material. The apparatus includes a movable tray-like receptacle that is open at its ends and conveys the long pieces of material. A drive mechanism is provided for introducing one of the ends of the receptacle into the receiving spaces. The receptacle is equipped with CATERPILLARS that are guided over chain wheels provided at the ends of the receptacle.

16 Claims, 9 Drawing Sheets

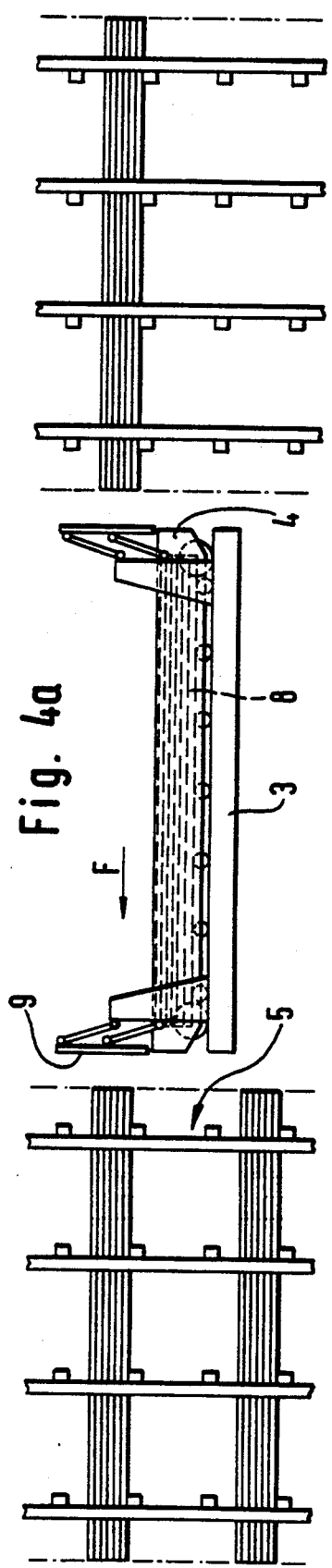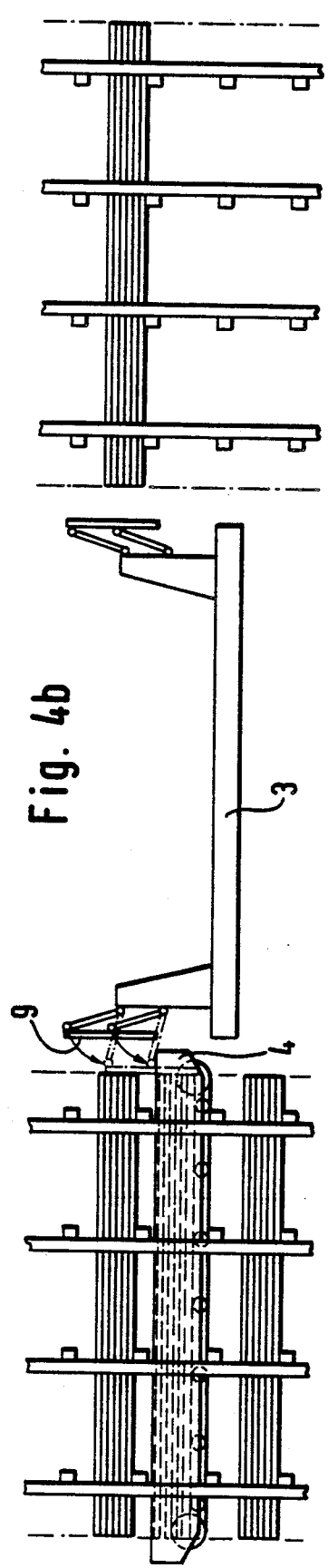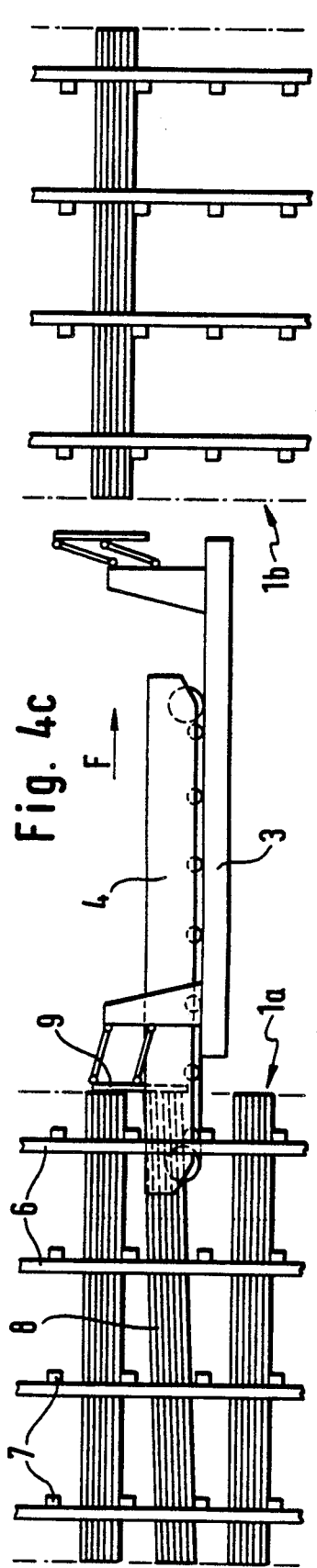

APPARATUS FOR DEPOSITING LONG PIECES OF MATERIAL

BACKGROUND OF THE INVENTION

Apparatus for depositing long pieces of material, such as pipes, rods, etc., are known. Such apparatus generally comprise shelf units having rows of shelves that are disposed one above each other and next to one another, with a passageway being provided between each two adjacent rows of shelf units. Disposed in this passageway between the rows of shelf units is a vertically movable lifting platform with which the long pieces of material are conveyed to the individual receiving spaces that are superimposed over one another. To convey the long pieces of material into the individual receiving space via the lifting platforms, receptacles are used that accommodate the long pieces of material and that can be introduced into the individual receiving spaces to deposit the material, and after being emptied are again withdrawn. The shelf units, with their rows of shelves, comprise vertical posts that are connected by horizontal crossbeams.

With one heretofore known apparatus for depositing long pieces of material into the receiving spaces of such a shelf unit, a trough or tray-like receptacle is provided that can be introduced into, and withdrawn from, the individual receiving spaces via rollers. For this purpose, it is necessary that each of the plurality of receiving spaces provided in a shelf unit for the long pieces of material be equipped with transport rails upon which the rollers of the receptacle can travel. These transport rails must structurally be oriented precisely with the track width of the rollers and, since the weight of a receptacle that is loaded with long pieces of material is very high, must be of appropriately substantial dimensions. These rails are generally formed by L-or U-shaped profiled members. Thus, with the heretofore known construction, the L- or U-shaped rails must conform to the respective construction of the receptacle, in particular to the spacing of the individual rollers of this receptacle. Since great weights must be transported and deposited, these profiled rails are furthermore very heavy; viewed as a whole, these rails require a considerable technical and economical outlay.

It is an object of the present invention to embody an apparatus of the aforementioned general type in such a way that profiled rails for introducing the receptacle for the long pieces of material are no longer necessary, so that an individual structural conformation between the movable receptacle and the shelf unit is no longer required, and the shelf units can be lighter in weight and cheaper to produce.

BRIEF DESCRIPTION OF THE DRAWINGS

This object, and other objects and advantages of the present invention, will appear more clearly from the following specification in conjunction with the accompanying schematic drawings, in which:

FIGS. 4a to 4c are views that show three different stages of the depositing process using the apparatus of FIG. 2;

SUMMARY OF THE INVENTION

Figure 1:
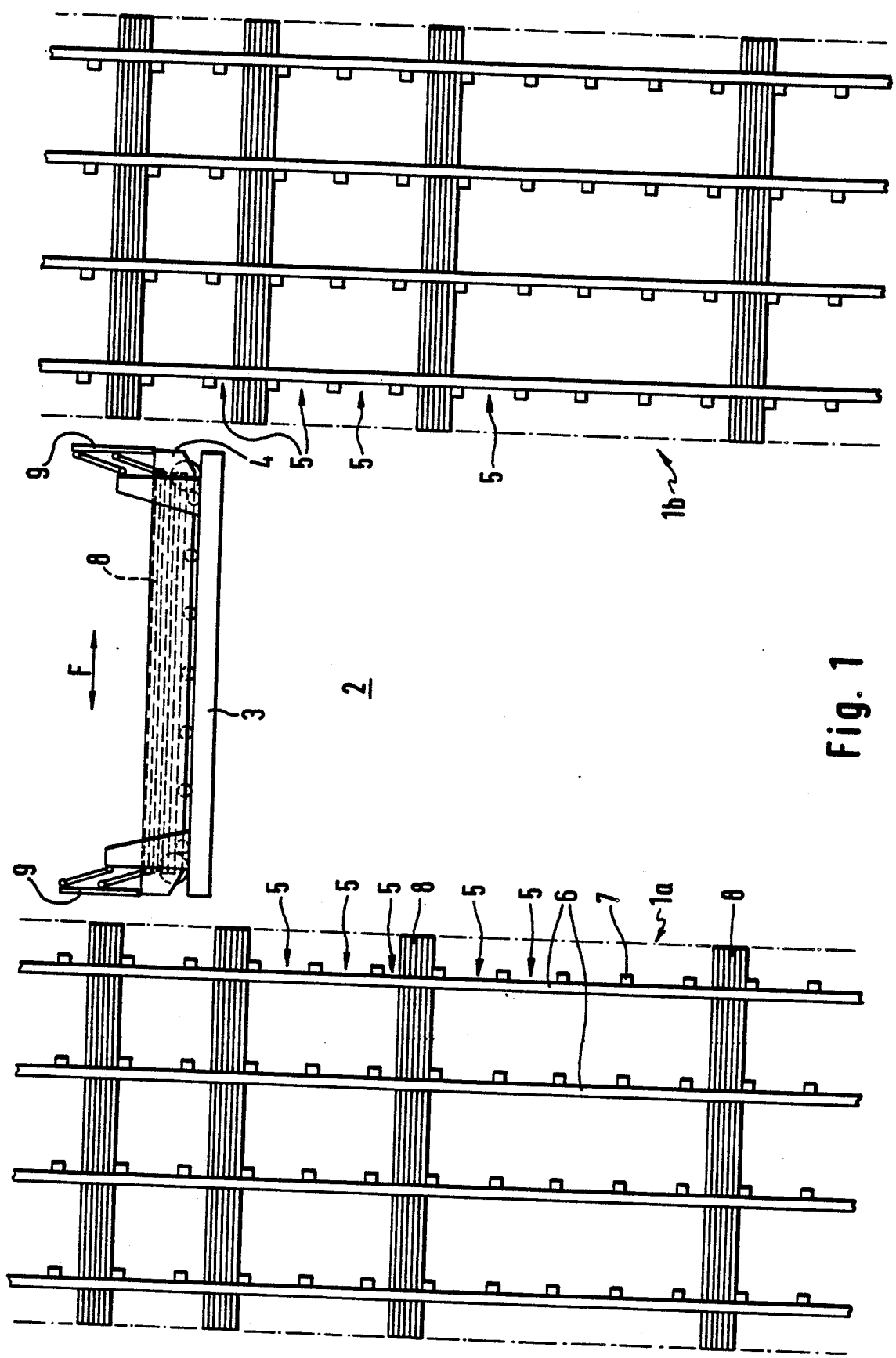
FIG. 1 is a vertical side view of a storage arrangement for long pieces of material, with a lifting platform and a receptacle for long pieces of material disposed thereon.

The apparatus of the present invention is characterized primarily in that the tray-like receptacle is equipped with endless CATERPILLARS that are guided over chain wheels provided at the ends of the receptacle.

By providing the tray-like receptacle with CATERPILLARS, it is possible to use the inventive receptacle in all conventional shelf units without the shelf unit having to have special rails that conform to the track width of the receptacle. Since nearly all shelf units are formed from vertical posts and reinforcing horizontal crossbeams that connect these posts, a tray-like receptacle that is provided for long pieces of material and is equipped with CATERPILLARS can be used in all known shelf units as long as the width of the individual superimposed and adjacent receiving spaces of the shelf units are large enough to accommodate the width of a receptacle provided with CATERPILLARS when the receptacle is introduced into the receiving spaces. It is no longer necessary to provide L- or U-shaped profiled guide rails, since the CATERPILLARS can readily be supported upon the slightly spaced apart crossbeams. Sufficient support can already be provided by two crossbeams if the spacing thereof corresponds to the length of the receptacle that is provided with CATERPILLARS. Furthermore, the advantage is realized that with the inventive configuration, side by side several tray-like receptacles provided with CATERPILLARS can be introduced into appropriately wide receiving spaces. Pursuant to one expedient specific embodiment of the present invention, a CATERPILLAR is disposed on each longitudinal side of the receptacle. Pursuant to a further expedient embodiment, the CATERPILLARS can be coupled with a drive mechanism that is preferably disposed on the lifting platform, which can be raised and lowered and which conveys the receptacle to an eligible receiving space of the individual rows of shelf units.

A particularly advantageous configuration of the inventive apparatus results if the drive mechanism is disposed directly on the movable receptacle itself. Advantageously, the drive mechanism is furthermore provided with means that assure a synchronous drive of both of the CATERPILLARS. Various possibilities exist for this embodiment. Pursuant to one such possibility, a motor equipped with two shaft ends acts upon the chain wheels, or a drive motor equipped with a drive shaft uniformly acts upon both CATERPILLARS via a connecting shaft. If a drive motor is used having an appropriately small speed for moving the receptacle at a reasonable speed, a reduction gearing can be eliminated and the motor can be coupled directly with the chain wheels. Pursuant to one modified embodiment of the drive mechanism, a drive motor acts upon the contact surfaces of the CATERPILLAR via the interposition of friction wheels. With this embodiment also it is expedient that both CATERPILLARS have force exerted synchronously thereupon, which can expediently be achieved by interconnecting two identical friction wheels, each of which cooperates with a respective CATERPILLAR, via a shaft, with this shaft, or one of the friction wheels, being driven by the motor.

In order to provide a contact surface that is as long as possible, it is advantageous for the chain wheels to be mounted in end regions of the wall portions of the receptacle, and for guide or slide bars and/or guide rollers for the CATERPILLARS to be provided between the front and rear chain wheels of a given wall portion. The alternative use of guide rollers is characterized by particularly low frictional forces, whereas the guide bar alternative represents the more economical approach.

Pursuant to one preferred specific embodiment of the side wall portions, the lower section thereof is embodied as a downwardly open profiled guide means that guides the CATERPILLAR and out of which the contact surface of the CATERPILLAR projects. This arrangement not only contributes to a greater stability and torsional rigidity of the tray-like receptacle, but also serves for the exact guidance of the CATERPILLAR and hence the precise positioning of the receptacle in the receiving spaces.

As is known, the commissioning process is ended by depositing the long pieces of material on the crossbeams in the provided receiving space. The removal of the long pieces of material from the receptacle and the depositing thereof upon the crossbeams, for example, can be effected with the aid of a pusher, which has the inner cross-sectional configuration of the receptacle and is movable relative thereto, so that when the receptacle is withdrawn from the receiving space, the long pieces of material that rest on the transverse rollers roll out of the receptacle.

The number of transverse rollers depends upon the length of the receptacle. It has been established that with conventional dimensions of long pieces of material, for example approximately six to seven meters, at least five transverse rollers, and preferably seven transverse rollers, should be provided. These transverse rollers should all have the same diameter and should be distributed at a nearly uniform spacing over the length of the receptacle. For the discharge of the long pieces of material, it is particularly expedient for at least a portion of the total number of transverse rollers to be capable of being driven, so that the long pieces of material can be removed from the receptacle by the rotational movement of the rollers. In this respect, it is particularly advantageous for the transverse rollers to be provided with a chain or drive wheel over which is stretched a transfer chain or drive belt. To guarantee an exact operating progress or movement sequence that does not lead to deviations as a result of varying slippage it is expedient to provide the CATERPILLARS, the transfer chains, and/or the drive belts with tensioning means that are preferably embodied as tensioning rollers.

Depending upon the configuration of the side wall portions it may not be possible to accommodate the drive means or the transverse rollers within these side wall portions. It is therefore proposed that a cover be provided that is secured to one of the side wall portions and that covers the drive means for the transverse rollers. It is particularly expedient if the cover means extend at a slight distance above the transverse rollers and be provided with sections that project downwardly in the region between the transverse rollers. This assures that it is possible to load the receptacle with long pieces of material without special precautionary measures, and that the drive means for the transverse rollers is reliably protected from damage.

Pursuant to one particularly preferred specific embodiment of the drive for the transverse rollers, the transfer chain is stretched over a drive sprocket that is mounted together with a chain wheel of the CATERPILLAR on a shaft, yet can be driven independently thereform. This independent drive is important due to the fact that the transverse rollers, for the transport of the long pieces of material, remain stationary until the receiving space is reached, and are driven only for depositing the long pieces of material in the receiving space provided therefore. Pursuant to one preferred specific embodiment of the present invention, the drive sprocket can be coupled when needed to the chain wheel of the CATERPILLAR. This can suitably involve a claw or dog coupling, or some similar type of coupling, where the coupling elements positively engage one another.

In one particularly suitable specific embodiment of the present invention, the direction of rotation of the transverse rollers is opposite to the direction of movement of the receptacle, whereby the speed at the generatrices of the transverse rollers is the same as the speed of the receptacle. This results in a relative standstill of the long pieces of material relative to the receiving space of the shelf unit, which at the same time, however, means a relative movement relative to the receptacle. The long pieces of material projecting from the receptacle are thus deposited upon the crossbeams of the shelf unit, and finally rest completely upon the crossbeams of the pertaining receiving space as the long pieces of material roll off from the last transverse roller.

Further specific features of the present invention will be described in detail subsequently.

DESCRIPTION OF PREFERRED EMBODIMENTS

Referring now to the drawings in detail, FIG. 1 schematically illustrates a storage arrangement for long pieces of material, with two rows 1a and 1b of shelf units, between which is a passageway 2, being shown. A lifting platform 3 is horizontally and vertically movable in the passageway 2 between the rows 1a and 1b of shelf units. The lifting platform 3 serves for raising a trough or tray-like receptacle 4 to the individual receiving spaces 5, which are disposed one above the other and, in the horizontal direction, across from one another. The receiving spaces 5 are formed by vertical posts 6 and horizontal crossbeams 7. The receiving spaces 5 serve for storing various types of long pieces of material 8, such as rods, pipes, etc.

Disposed on the lifting mechanism 3, on each side, are pushers 9 that can be lowered; the function of these pushers will be described in detail subsequently in conjunction with FIG. 2. The receptacle 4 is equipped with CATERPILLARS via which it is possible to introduce the receptacle 4 into and withdraw it from the receiving spaces 5 in the direction of the double arrow F. The construction of the inventive apparatus will be described in detail subsequently in conjunction with the remaining figures.

Figure 2:
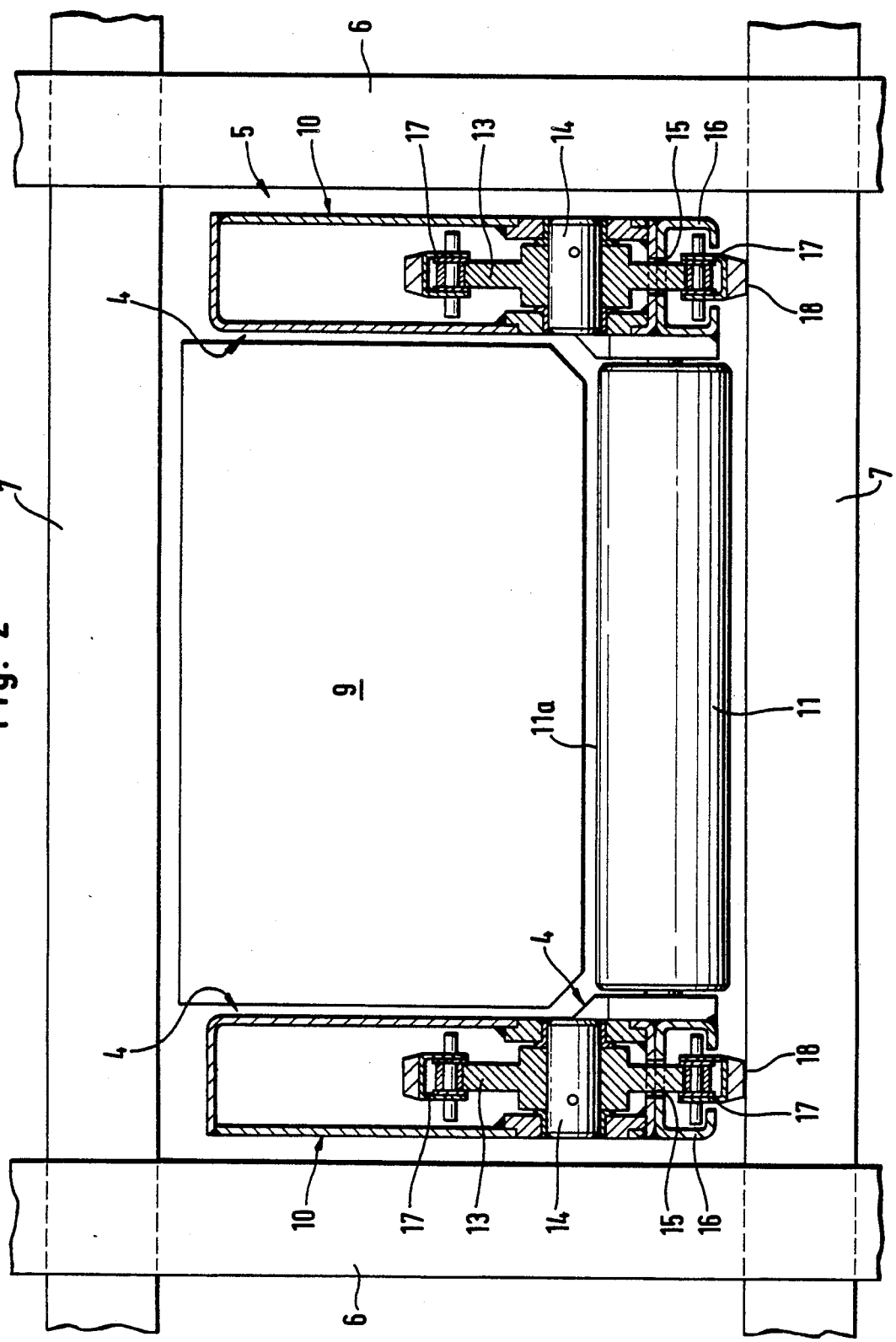
FIG. 2 is a cross-sectional view, transverse to the direction of movement, of one exemplary embodiment of the inventive receptacle for depositing long pieces of material.
Figure 3:
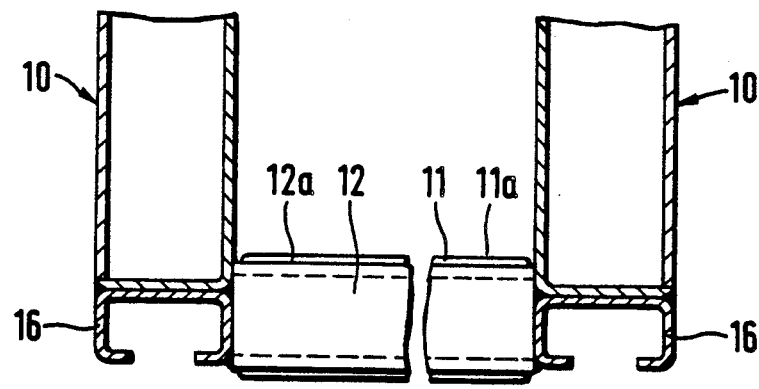
FIG. 3 is a simplified cross-sectional view in the vicinity of a crossmember.

FIG. 2 is a cross-sectional view through a receptacle 4 for receiving long pieces of material, with the tray shape of the receptacle 4 being formed by the side wall portions 10 and the transverse rollers 11 that are disposed therebetween. Since the transverse rollers 11, which are rotatably mounted on the wall portions 10, cannot provide the necessary rigidity for the tray-like receptacle 4, the side wall portions 10, as illustrated in FIG. 3 are welded together to form a rigid structure via welded-on crossmembers 12. However, since the upper generatrices 11a of the transverse rollers 11 must be disposed higher than the upper edges 12a of the crossmembers 12 (see FIG. 3), the transverse rollers 11 form a support and hence the base of the receptacle 4 upon which the long pieces of material rest (not shown in FIG. 2).

In the cross-sectional view illustrated in FIG. 2, the receptacle 4 is disposed in a receiving space 5 of the shelf unit between posts 6 and crossbeams 7. In addition, a pusher 9 is shown in the lowered position for holding the long pieces of material in place when the receptacle 4 is withdrawn from the receiving space 5, so that the long pieces of material are slidingly pushed out of the receptacle 4 on the rollers 11. In each of the side wall portions 10, a chain wheel is rotatably mounted on a spindle or shaft 14. The lower portion of the chain wheel 13 extends through an appropriate opening in the lower portion of the wall portion 10 into a profiled guide means 16 that is connected to the wall portion 10. Respective endless CATERPILLARS 17 are stretched over the chain wheels 13, with the CATERPILLARS being precisely guided in the profiled guide means 16. The lower links of the CATERPILLAR 17 project from the underside of the profiled guide means 16, thereby forming the support or contact surface 18 of the CATERPILLARS 17. It is to be understood that the profiled guide means 16 are provided with the openings 15 only in the vicinity of the chain wheels 13, and are otherwise closed off in the direction toward the side walls, as can be seen from FIGS. 2 and 3.

The commissioning process and the manner of operation of the receptacle 4 will now be described with the aid of FIGS. 4a to 4c. The receptacle 4, which contains the long pieces of material 8 and is disposed on the lifting platform 3, is first brought into a position in which the receptacle is positioned exactly in front of an empty receiving space 5. Once this position has been reached, receptacle 4, the CATERPILLARS of which can be driven via a drive mechanism, is introduced completely into the receiving space 5, as a result of which the material that is to be commissioned is also disposed completely within the receiving space 5. This process is illustrated in FIG. 4b. The pusher 9 disposed on the lifting platform 3 is then lowered, so that with the exception of a small gap relative to the transverse rollers 11 and the side wall portions 10, one end of the receptacle 4 is closed off For the position assumed by the pushers 9, refer to FIG. 2.

To deposit the long pieces of material 8 into the receiving space 5 provided therefor, the receptacle 4 is withdrawn from the receiving space on the lifting platform 3, as is illustrated in FIG. 4c. Since the lowered pusher 9 holds the long pieces of material 8 in place, the pieces of material roll down from the transverse rollers 11 and rest upon the crossbeams 7 of the row 1a of shelf units. The empty receptacle 4 is then ready to be refilled with long pieces of material and is available for the next commissioning process.

Figure 5:
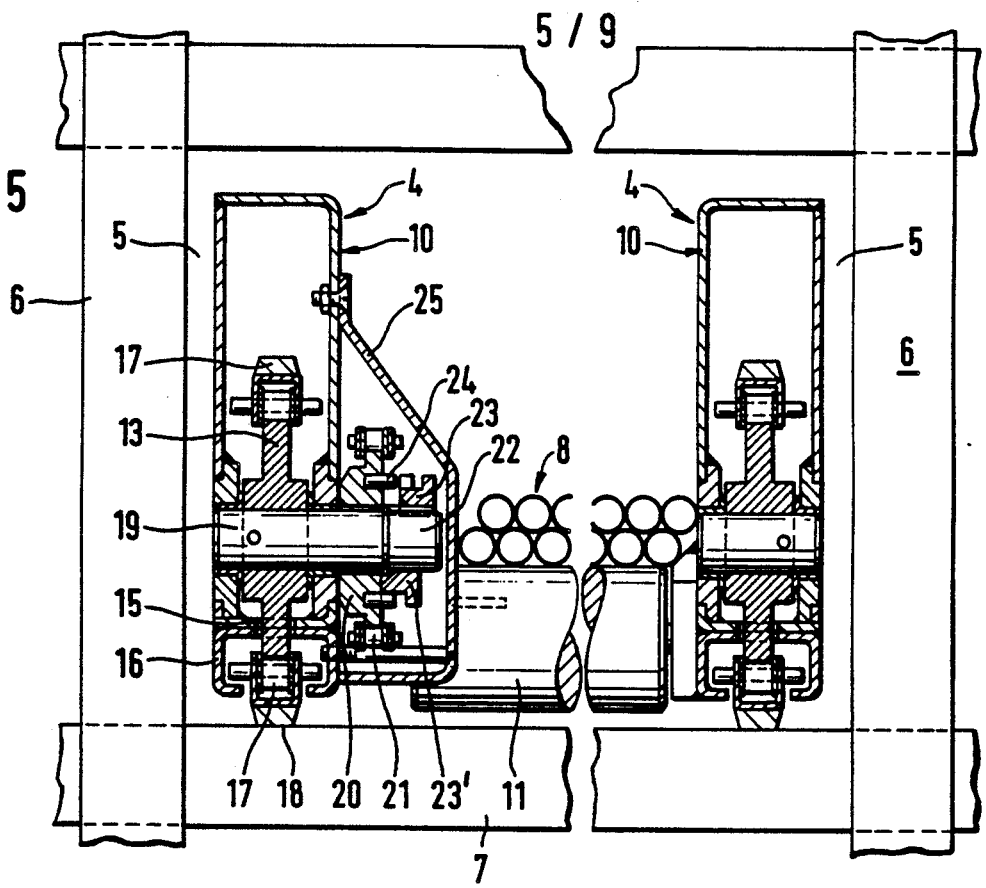
FIG. 5 is a cross-sectional view through a further exemplary embodiment of the inventive receptacle, similar to the view of FIG. 2, in the region of the drive sprockets.

FIG. 5 is another cross-sectional view through a receptacle 4 that is disposed in a receiving space 5, this time through the shafts of the chain wheels. Since essential components of this illustration coincide with those in FIG. 2, the same reference numerals are used for the same parts. In addition, in FIG. 5 the long pieces of material 8 in the form of round bars are shown resting on the transverse rollers 11. The alternative embodiment of FIG. 5 differs from that of FIG. 2 in that the transverse rollers 11 are provided with a drive mechanism for rotating the rollers 11 and hence depositing the long pieces of material. For this purpose, the left chain wheel 13 of FIG. 5 is secured to a longer shaft 19 that extends into the interior of the receptacle 4. Disposed on a portion of this extended shaft 19 is a drive sprocket 20 that can rotate freely upon the shaft 19. Stretched over the drive sprocket 20 is a transfer chain 21 that serves to drive the transverse rollers 11 when necessary. A coupling member 23 is non-rotatably yet axially displaceably mounted on an extension 22 of the shaft 19. In the manner of a claw or dog coupling, the coupling member 23 can be brought into engagement with a coupling pin 24 that projects in the axial direction from the drive sprocket 20. In FIG. 5, the upper half of the coupling member 23 is shown in the disengaged position, and the lower half 23' of the coupling member is shown in a coupled state. This drive mechanism for the transverse rollers 11 is covered via a sheet-metal hood 25 that is secured to the side wall portion 10, for example via screws. This hood 25 serves, on the one hand, to protect against accidents, and on the other hand serves to protect the drive means from damage by the long pieces of material 8.

Figure 6:
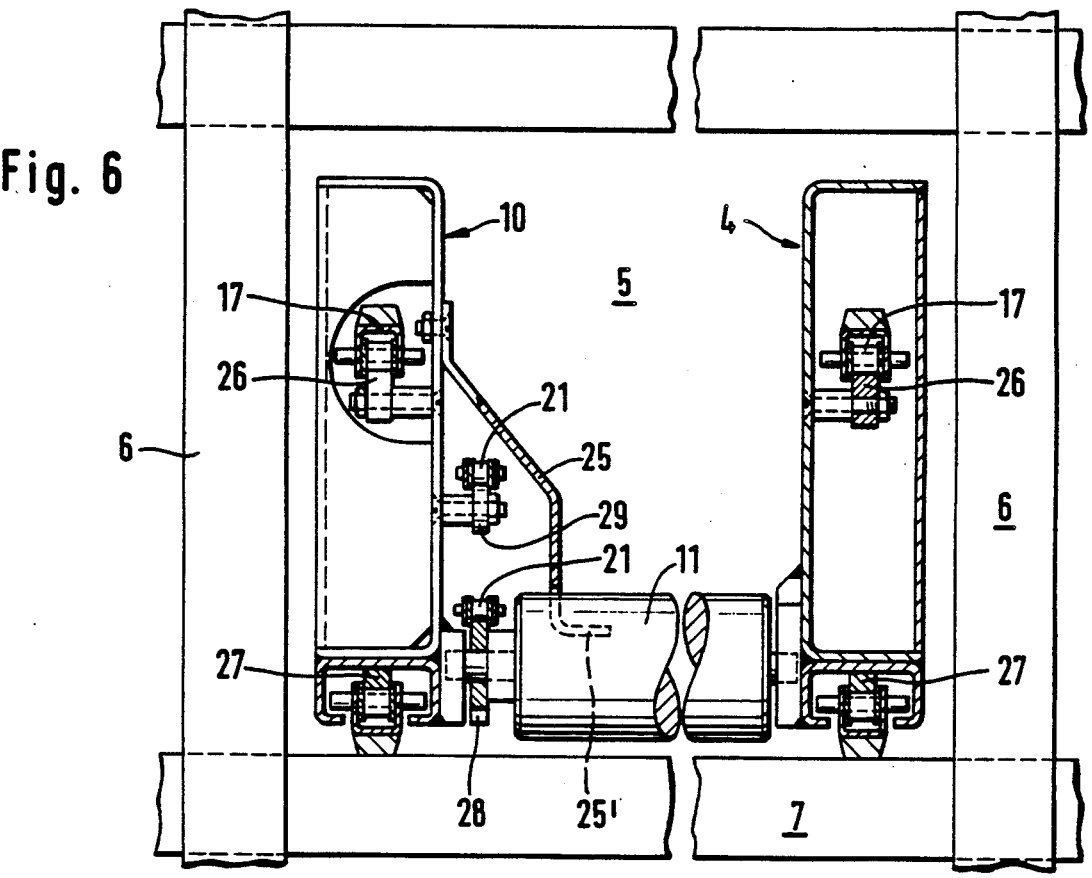
FIG. 6 is a cross-sectional view in a different plane showing a receptacle similar to that of FIG. 5 with driven transverse rollers.

FIG. 6 is a cross-sectional view through the apparatus of FIG. 5, but is taken in a different plane, in particular more toward the center of the receptacle 4. This view shows that not only the upper horizontal movement, i.e. the upper run, but also the lower horizontal movement, i.e. the bottom run, of the CATERPILLARS 17 are guided on guide or slide bars 26 and 27. The guide bars 26 prevent the CATERPILLARS 17 from sagging, and the guide bars 27 assure a uniform progress of the CATERPILLARS, even when the underlying surface is uneven, or when the CATERPILLARS travel over the crossbeams 7. The left end of the transverse roller 11 illustrated in the embodiment of FIG. 6 is provided with a chain wheel 28 that is rigidly connected to the transverse roller 11 and that can be driven by the transfer chain 21. After the transfer chain 21 has been guided over all of the chain wheels 28, it is returned to the upper portion below the sheet-metal hood 25, with guide bars or rollers 29 being provided for an exact guidance of the transfer chain 21. FIG. 6 also shows that the hood 25 extends to just above the transverse roller 11, and is provided with a section 25' that extends into the region between two transverse rollers 11.

Figure 7:
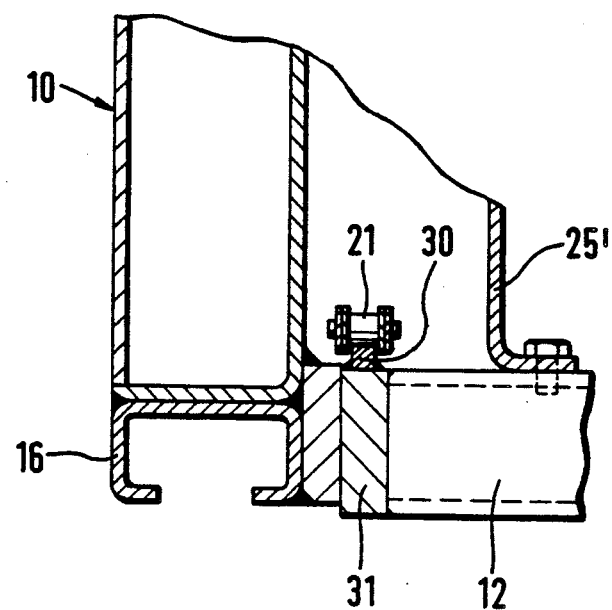
FIG. 7 is a detailed view showing an alternative embodiment to that illustrated in FIG. 3.

FIG. 7 shows a detailed portion of an alternative embodiment to that illustrated in FIG. 3, namely the arrangement of a crossmember 12 on a side wall portion 10 or profiled guide means 16. In the embodiment of FIG. 7, a spacer or intermediate piece 31 is secured to the crossmember 12. Disposed on the upper side of the intermediate piece 31 is a guide bar 30 upon which the transfer chain 21 is guided in the region between two adjacent chain wheels of the transverse rollers.

The section 25' of the hood 25 can be secured to the crossmember 12 by screws or the like, so that the drive system is easily accessible for the purpose of carrying out maintenance or repair work.

Figure 8:
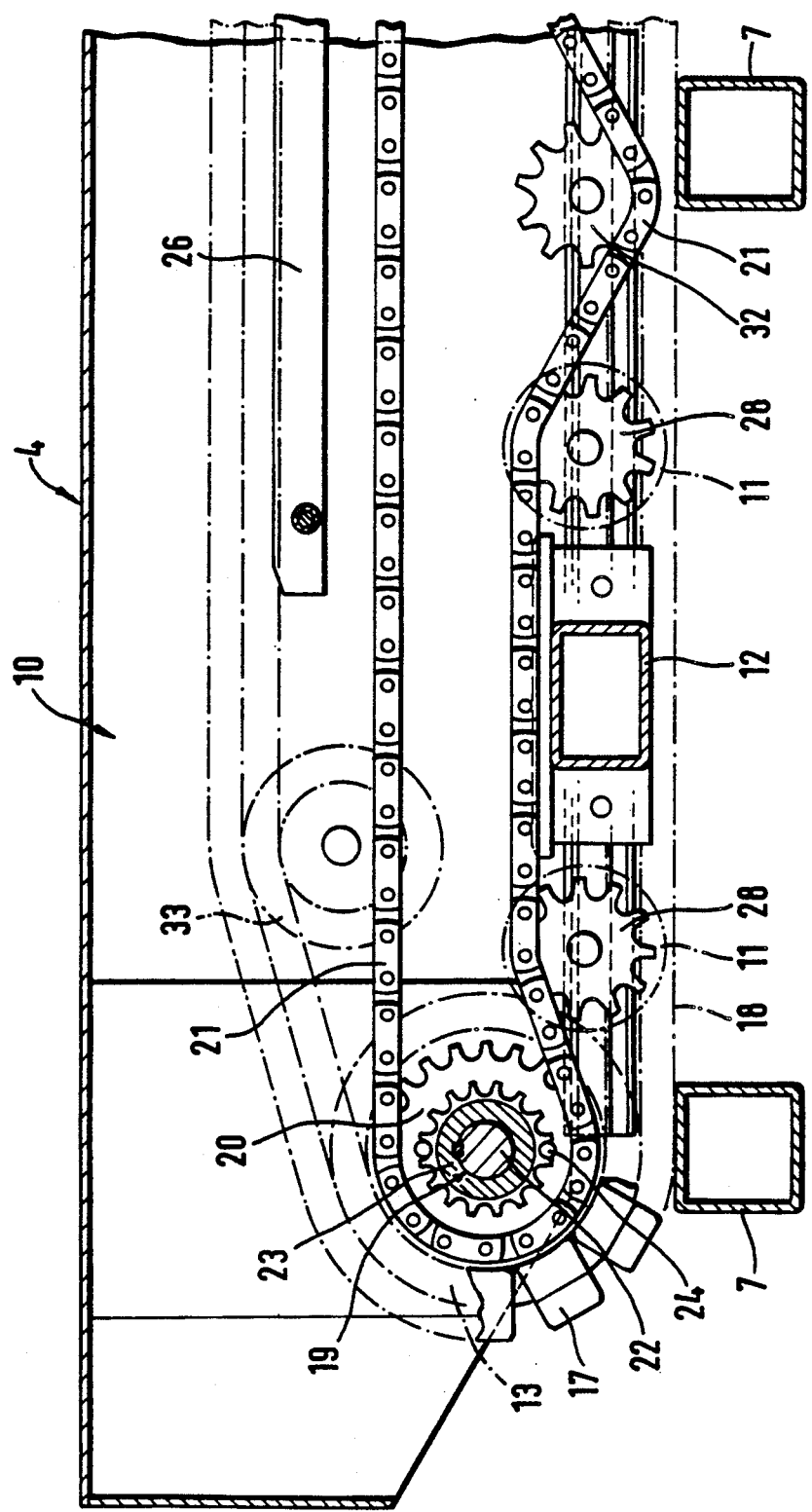
FIG. 8 is a partial cross-sectional side view of the receptacle of FIGS. 5 and 6.

FIG. 8 shows a portion of a side view or longitudinal cross-sectional view of the receptacle of FIGS. 5 and 6. By means of the contact surface 18 of the CATERPILLAR 17, the receptacle 8 rests upon the crossbeams 7 of the shelf unit. FIG. 8 also shows that a crossmember 12 is disposed between two transverse rollers 11. In conformity with the illustration of FIG. 3, the crossmember 12, together with the side wall portions, form the structure of the receptacle 4. Disposed on the extension 22 of the shaft 19 is the coupling member 23 with which the coupling pins 24 of the drive sprocket 20 engage. The transfer chain 21 is guided over the drive sprocket 20 and extends in the lower portion over the upper periphery of the chain wheels 28. In addition, a tensioning roller 32 is provided for tensioning the transfer chain 21. The CATERPILLAR 17 is placed over the outer gear ring of the chain wheel 13, and is guided to the guide bar 26 via the tensioning roller 33, the height of which can be adjusted. Due to the specific guidance of the transfer chain 21 over the upper portion of the chain wheels 28, a travelling motion of the receptacle 4 to the right in the drawing results in a counterclockwise rotation of the transverse rollers 11; this presumes, of course, that the coupling is connected. Due to the fact that the receptacle 4 and the transverse rollers 11 are moving in opposite directions, the long pieces of material disposed in the receptacle 4 remain, so to speak, fixed; in other words, the long pieces of material do not move relative to the shelf unit, and are rolled out of the receptacle 4 at a uniform speed via the transverse rollers 11 as the receptacle 4 is withdrawn from the shelf unit. Thus the long pieces of material rest upon the crossbeams 7 of the shelf unit, as was described in connection with FIGS. 4a–4c.

Figure 9:
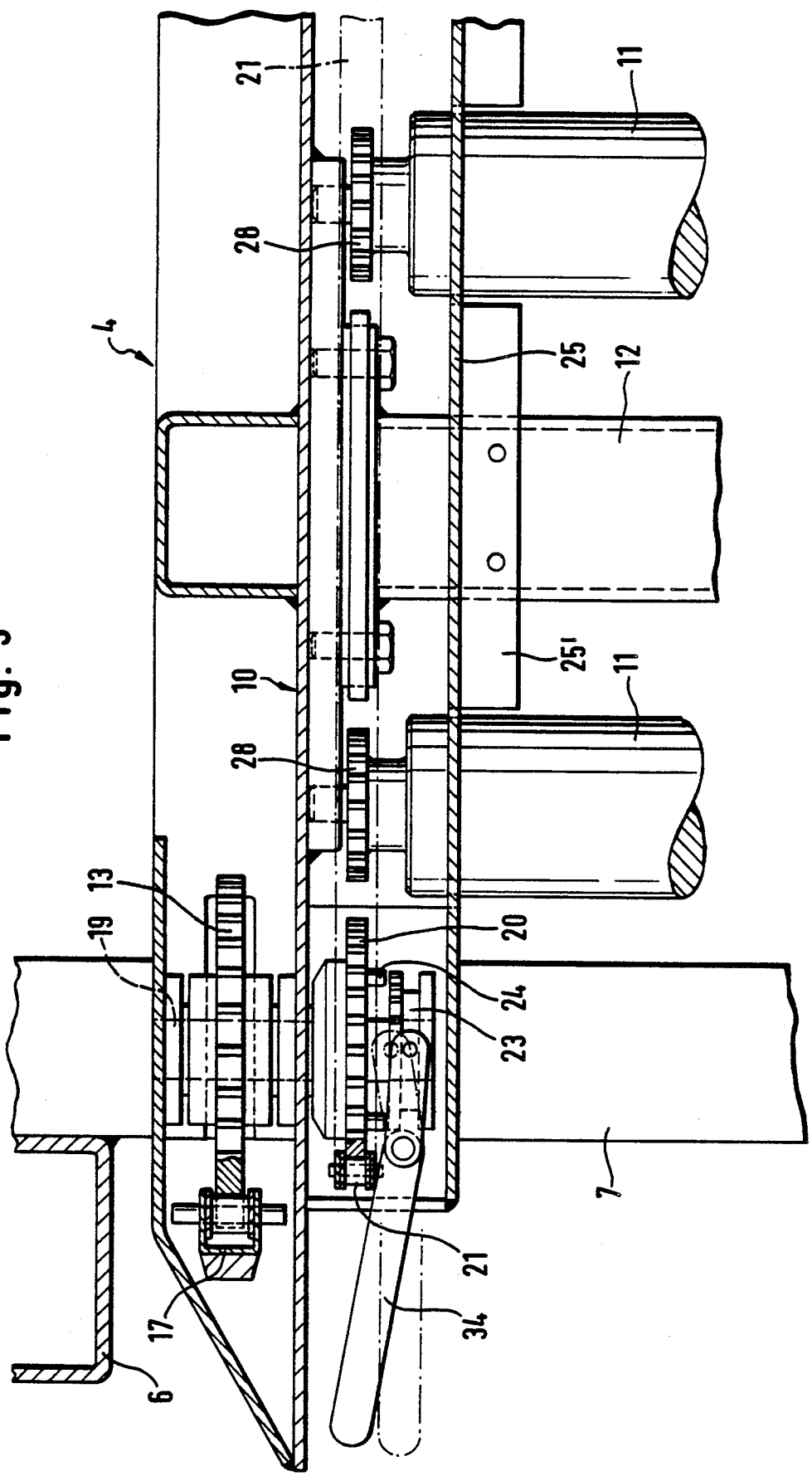
FIG. 9 is a cross-sectional plan view of a portion of a receptacle of FIG. 8.
Figure 10:
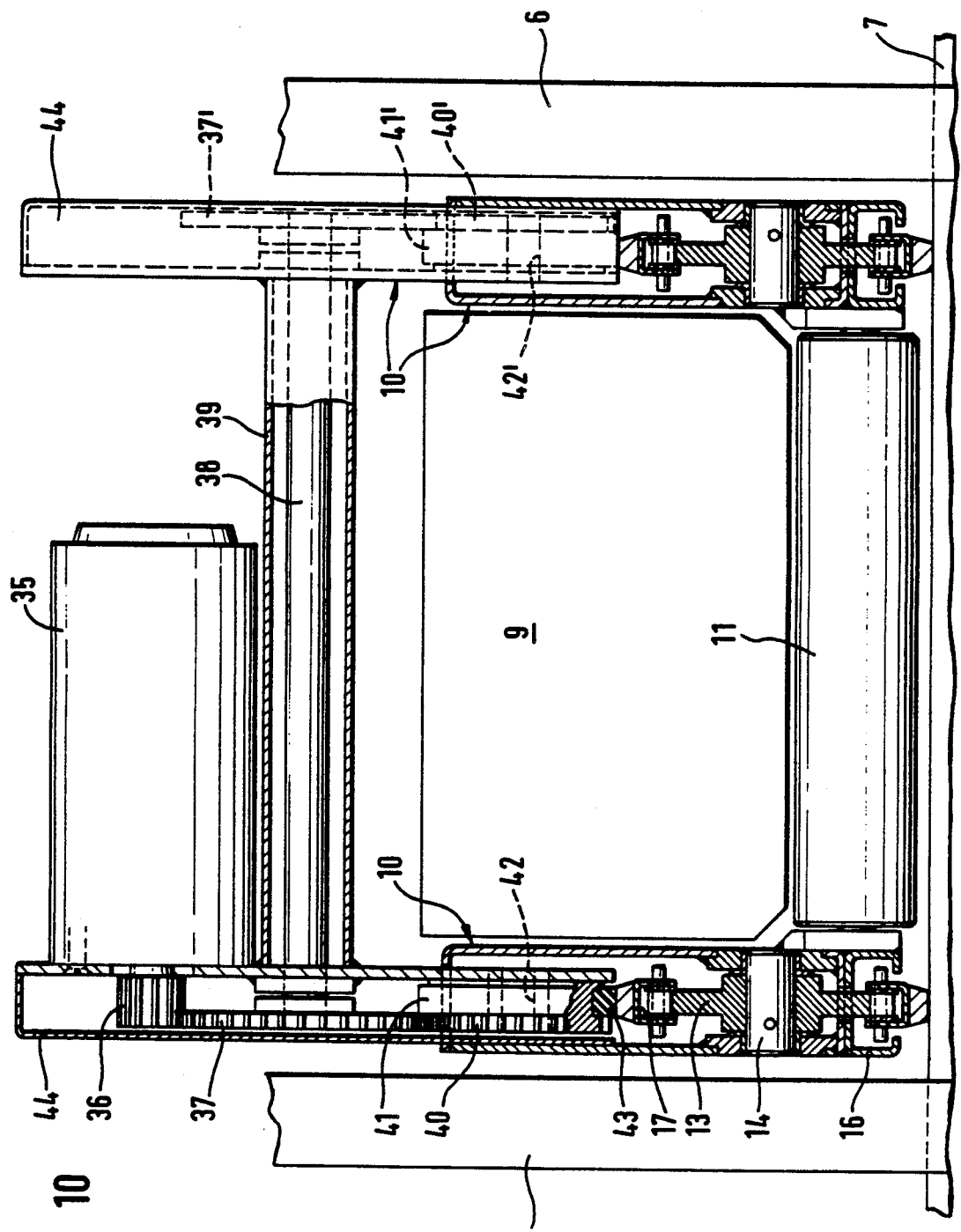
FIG. 10 is a cross-sectional view of the drive end of a receptacle similar to that of FIG. 2.

FIG. 9 is a plan view showing part of the receptacle 4 of FIG. 8. The reference numeral 6 again indicates a vertical post, and the reference numeral 7 indicates a crossbeam of the shelf unit. Welded to the side wall portion 10 is a crossmember 12 that extends parallel to the transverse rollers 11. The transverse rollers 11 are provided with chain wheels 28 over which a transfer chain 21 is placed. The transfer chain 21 is stretched over a drive sprocket 20 that is mounted on a shaft 19 together with a further chain wheel 13 and a coupling member 23. The CATERPILLAR 17, on which the receptacle 4 can travel, runs over the chain wheel 13. Attached to the coupling member 23 is a coupling lever 34, actuation of which into the dot-dash line position effects engagement of the coupling member 23 with the coupling pin 24, resulting in a driving of the transverse rollers 11 As can be seen in FIG. 9, the sheet-metal hood 25 covers the entire region of the drive mechanism of the transverse rollers 11, including the pertaining coupling in the front part of the receptacle 4. FIG. 10 shows a variation of the embodiment of FIG. 2 with a drive mechanism mounted on the receptacle 4. The drive mechanism includes a motor 35, on the shaft of which is secured a pinion 36 that meshes with an intermediate gear wheel 37. The intermediate gear wheel 37 is secured to a connecting shaft 38 that is guided in a connecting tube 39 between the side wall portions 10. Secured to that end of the connecting shaft 37 remote from the pinion 36 is a second intermediate gear wheel 37' that has the same circumference and number of teeth as does the first intermediate gear wheel 37 that meshes with the pinion 36. The respective gear rings of the intermediate gear wheels 37 and 37' mesh with gear wheels 40 and 40' that are connected with friction wheels 41 and 41' of the spindles 42 and 42'. The friction wheels 41 and 41' are in frictional contact with the CATERPILLARS 17, thereby transferring the rotational movement of the drive motor 35 to the CATERPILLARS 17 at an appropriately reduced speed. A good frictional engagement between the CATERPILLAR 17 and the friction wheels 41, 41' is achieved by providing the friction wheels with a hard rubber coating 43.

Since the intermediate gear wheels 37, 37', the gear wheels 40, 40', and the friction wheels 41, 41' have exactly the same configuration on both sides of the receptacle 4, a synchronous drive of the two CATERPILLARS is effected, so that an exactly straight ahead travel of the receptacle 4 is assured.

Figure 11:
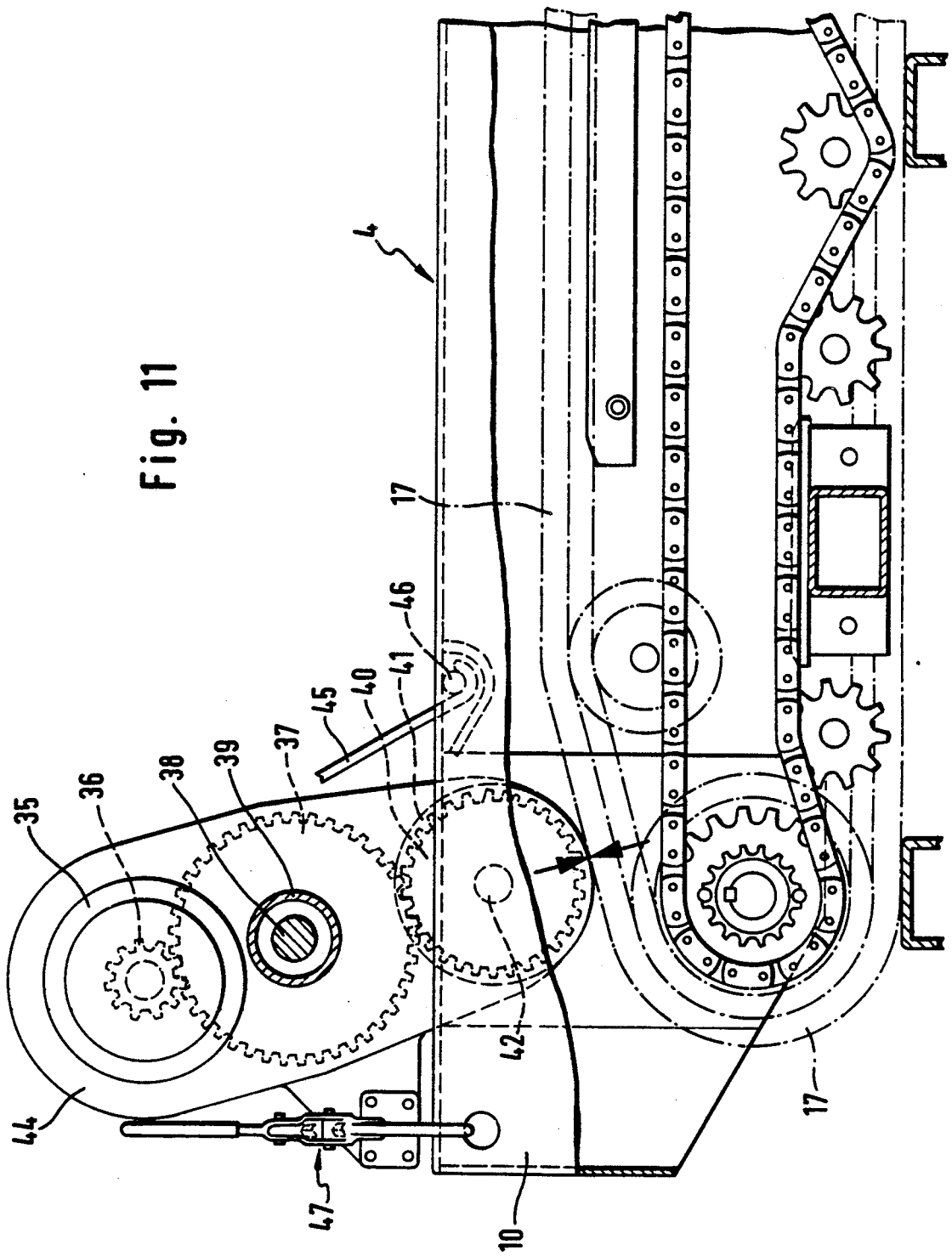
FIG. 11 is a partial side view of the receptacle of FIG. 8 with a drive mechanism.

FIG. 11 shows the receptacle 4 of FIG. 8 equipped with the drive mechanism of FIG. 10. Since the receptacle 4 coincides essentially with that of FIG. 8, only the additionally provided drive mechanism will be described. This drive mechanism includes the motor 35, which can, for example, be an electric or hydraulic motor, or a pneumatic drive. Via a pinion 36, the motor 35 drives an intermediate gear wheel 37, which is secured to a connecting shaft 38. The connecting shaft 38 is disposed in a connecting tube 39. The intermediate gear wheel 37 meshes via its gear ring with a gear wheel 40, which along with a friction wheel 41 is disposed on a common spindle 42. The friction wheel 41 is in frictional connection with the contact surface of the caterpillar 17. The entire drive mechanism is disposed in a support frame that includes side frame parts 44 and the connecting tube 39 that interconnects them. The drive mechanism is mounted on a bolt 46 by means of a hook means 45, and is tensioned via a tensioning device 47 in such a way that the necessary frictional force exists between the friction wheel 41 and the CATERPILLAR 17.

The present invention is, of course, in no way restricted to the specific disclosure of the specification and drawings, but also encompasses any modifications within the scope of the appended claims.

What I claim is:

1. In an apparatus for depositing long pieces of material, such as pipes or rods, in a shelf unit that has a number or vertically spaced receiving spaces for said long pieces of material, said apparatus including a horizontally and vertically movable tray-like receptacle that has open ends and conveys said long pieces of material, with a drive mechanism being provided for introducing one of the ends of said receptacle into said receiving spaces, comprising the improvement wherein:
chain wheels are provided on the receptacle in the vicinity of said ends of said receptacle;

CATERPILLAR type endless treads are guided over said chain wheels;
a pusher is provided; and
whereby rotation of the treads over the wheels causes said introduction of said end of said receptacle into one of said receiving spaces, and causes relative movement between the receptacle and the pusher when the receptacle is withdrawn from said one receiving space and thereby depositing said pieces of material into said one receiving space.

2. An apparatus according to claim 1, in which said receptacle has longitudinal sides between said ends thereof, with said treads being disposed on said longitudinal sides.

3. An apparatus according to claim 2, in which said longitudinal sides include wall portions that have end regions in the vicinity of said ends of said receptacle, with said chain wheels being respectively mounted in said end regions of said wall portions; and in which guide means for said treads are provided between forward and rear ones of said chain wheels of a given wall portion.

4. An apparatus according to claim 3, in which a lower portion of said wall portion is provided with a downwardly open profiled guide means from which projects a contact surface of said treads.

5. An apparatus according to claim 3, which includes a movable platform for conveying said receptacle to a selected receiving space; and in which said drive mechanism is disposed on said platform.

6. An apparatus according to claim 3, in which said drive mechanism is disposed on said receptacle.

7. An apparatus according to claim 6, which includes means for synchronously driving two treads.

8. An apparatus according to claim 6, in which said chain wheels are mounted on said wall portions via spindles; and which includes means for coupling said drive mechanism with said spindles.

9. An apparatus according to claim 8, in which said coupling means includes friction wheels that are effective upon the contact surfaces of said treads.

10. An apparatus according to claim 3, in which said receptacle includes transverse rollers for supporting said long pieces of material; and said pusher has a cross-sectional configuration of which corresponds to said receptacle, with said pusher being movable relative to said receptacle so that when said receptacle is withdrawn from a receiving space, said long pieces of material on said transverse rollers roll out of said receptacle.

11. An apparatus according to claim 10, which includes means for driving at least a portion of said transverse rollers.

12. An apparatus according to claim 11, in which each of said transverse rollers is provided with a drive wheel over which is stretched a drive chain or belt.

13. An apparatus according to claim 12, in which said receptacle includes side wall portions, on one of which is mounted cover means for covering said drive wheels and drive chain or belt of said transverse rollers.

14. An apparatus according to claim 12, in which one of said chain wheels is mounted on a shaft on which is also mounted a drive sprocket over which said drive chain or belt extends; and which includes means for drivingly connecting said one chain wheel and said drive sprocket.

15. An apparatus according to claim 14, in which said transverse rollers have a direction of rotation that is opposite to a direction of movement of said receptacle, with the speed at the generatrices of said transverse rollers being equal to the speed of said receptacle.

16. An apparatus according to claim 15, in which said means for drivingly connecting said one chain wheel and said drive sprocket is embodied as a dog coupling and is provided with an actuating lever.

* * * * *